Figure 1:
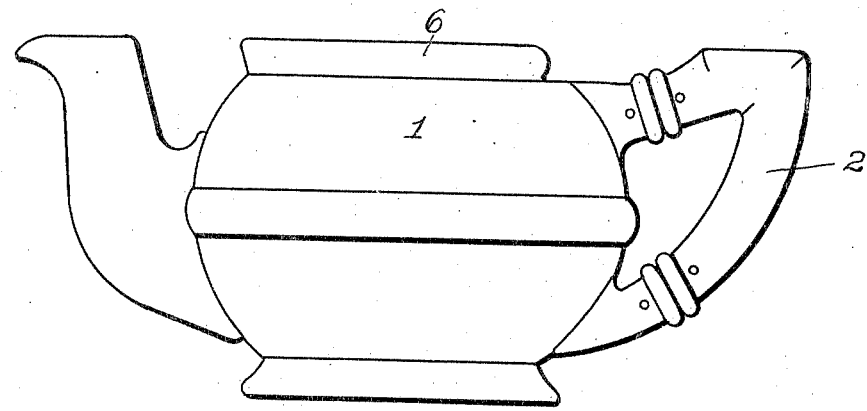

R. E. PETERS.
TEA OR COFFEE POT.
APPLICATION FILED MAY 23, 1919.

1,316,106.

Patented Sept. 16, 1919.

INVENTOR.
Richard E. Peters
by Joseph A. Miller
ATTORNEY.

UNITED STATES PATENT OFFICE.

RICHARD E. PETERS, OF PROVIDENCE, RHODE ISLAND, ASSIGNOR TO GORHAM MANUFACTURING COMPANY, OF PROVIDENCE, RHODE ISLAND, A CORPORATION OF RHODE ISLAND.

TEA OR COFFEE POT.

1,316,106.  Specification of Letters Patent.  Patented Sept. 16, 1919.

Application filed May 23, 1919. Serial No. 299,142.

*To all whom it may concern:*

Be it known that I, RICHARD E. PETERS, a citizen of the United States, residing at Providence, in the county of Providence and State of Rhode Island, have invented a new and useful Improvement in Tea or Coffee Pots, of which the following is a specification.

This invention relates to certain new and useful improvements in tea or coffee pots, and more particularly to pots used in lunch rooms, or cafeterias, and the primary object of the invention is to provide novel means whereby the coffee or tea will be prevented from egressing or splashing out of the pouring spout during carrying of the pots, such as, for example, from the kitchen to the tables.

In the drawings—

Figure 2:
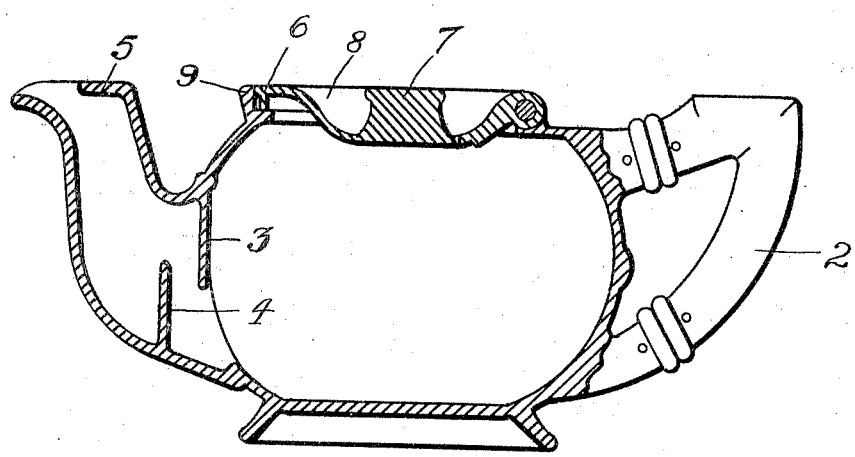

Figure 1 is a side elevation of a pot constructed in accordance with the present invention, and Fig. 2 is a partial vertical sectional view of Fig. 1, and partial side elevation.

In proceeding in accordance with the present invention, the pot is formed with a body 1 and the usual handle 2. The spout 3 has the usual inlet and outlet due to the open character of its ends, while projecting downwardly from the upper portion of the body is a baffle plate 3, which latter extends partly across the spout inlet leaving the lower portion of the inlet free and unobstructed. A like baffle plate 4 is disposed within the spout in advance of the baffle plate 3, and in spaced relation thereto, the plate 4 extending upwardly from the bottom wall of the spout and terminating in a plane located above the plane of the lower or free end of the baffle plate 3, as depicted in Fig. 2. The outlet end of the spout is also provided with a horizontal baffle plate 5, which extends from the inner side of the spout toward the outer side thereof, being spaced from the outer side so as to leave pouring space, as shown in Fig. 2, of the drawings.

It will be apparent from the foregoing that tea or coffee will be prevented from splashing or egressing out of the spout during carrying of the pot, since the liquid will be held in restraint by the several baffles, the baffles 3 and 4 serving to prevent back and forth movement of the body of liquid contained within the spout during carrying. The baffle 5 is preferably formed by an extension of the inner side wall of the pouring spout, thus simplifying the manufacture and decreasing the cost of production.

The invention is preferably used with a flat faced top or cover 6, the knob 7 for lifting the cover being disposed so that its outer end is flush with the outer face of the cover, which formation is preferably provided by forming a channel 8, around the knob 7 so as to provide space for the fingers permitting the knob to be easily grasped. It will thus be apparent that the pots may be stacked one upon the other or dishes may be placed on the top of the pot without danger of slippage due to an insecure footing of the dishes or pots so stacked. As shown in Fig. 2 the top is flush with the rim 9, the latter serving to confine the cover as usual.

Having thus described my invention, what I claim as new and desire to secure by Letters Patent is—

In a tea or coffee pot, a body having a pouring spout, a baffle extending downwardly within the spout at the inlet end thereof, a second baffle within the spout extending upwardly and in advance of the first baffle, and a third baffle at the outlet end of the spout extending horizontally from the inner toward the outer side of the spout and at substantially right angles to the first named baffles.

In testimony whereof I have signed my name to this specification in the presence of two subscribing witnesses.

RICHARD E. PETERS.

Witnesses:
GEORGE A. BURLINGAME,
EDW. J. PARKER.

Copies of this patent may be obtained for five cents each, by addressing the "Commissioner of Patents, Washington, D. C."